United States Patent [19]

Steiner

[11] 4,147,762

[45] Apr. 3, 1979

[54] REDUCTION OF $SO_2$ WITH COAL

[75] Inventor: Peter Steiner, Edison, N.J.

[73] Assignee: Foster Wheeler Energy Corporation, Livingston, N.J.

[21] Appl. No.: 635,497

[22] Filed: Nov. 26, 1975

Related U.S. Application Data

[63] Continuation-in-part of Ser. No. 489,337, Jul. 17, 1974, abandoned, and a continuation-in-part of Ser. No. 279,410, Aug. 10, 1972, abandoned.

[51] Int. Cl.$^2$ .............................................. C01B 17/04
[52] U.S. Cl. .................................... 423/569; 423/563
[58] Field of Search ................ 423/563, 569, 570, 572

[56] References Cited

U.S. PATENT DOCUMENTS

| Re. 19,531 | 4/1935 | Benner et al. | 423/569 |
|---|---|---|---|
| 224,426 | 2/1880 | Hartmann | 423/563 |
| 587,068 | 7/1897 | Stickney | 423/572 |
| 1,134,846 | 4/1915 | Hall | 423/569 |
| 2,148,258 | 2/1939 | Carter | 423/569 |

FOREIGN PATENT DOCUMENTS

| 139421 | 10/1948 | Australia | 423/563 |
|---|---|---|---|
| 775910 | 1/1935 | France | 423/569 |

OTHER PUBLICATIONS

Averbukh, J. D., et al., "Zhurnal Prikladnoi Khimii" vol. 43, No. 2, Feb. 1970; pp. 228–236.

Wagner; Coal & Coke; McGraw-Hill, N.Y., N.Y., 1916, pp. 186 & 258.

*Primary Examiner*—G. O. Peters
*Attorney, Agent, or Firm*—Marvin A. Naigur; John E. Wilson

[57] ABSTRACT

An improved process for the reduction of $SO_2$ is provided in which a gas containing $SO_2$ is contacted with granular coal in the presence of steam.

8 Claims, 3 Drawing Figures

REDUCTION OF SO₂ WITH COAL

CROSS-REFERENCE TO RELATED APPLICATIONS

This application is a continuation-in-part of application Ser. No. 489,337, filed on July 17, 1974, and of application Ser. No. 279,410, filed on Aug. 10, 1972 and both now abandoned.

BACKGROUND OF THE INVENTION

With the advent of air pollution control requirements, it has been necessary to remove sulfur dioxide from effluent gases that had previously been expelled into the atmosphere. The further processing of the so-accumulated sulfur dioxide is a practical necessity, and accordingly, various systems have been proposed for converting the sulfur dioxide to sulfur, such as by using natural gas or some other relatively expensive reducing agent. In accordance with the present invention, however, high sulfur coal can be used as the reducing agent. This enables the obtainment of a two-fold advantage, in that coal is much less expensive than natural gas and other reducing agents, and also in that a use can be provided for the high sulfur coal which no longer is in demand for power plant use in view of the more stringent air pollution requirements that have been promulgated. A significant advantage afforded by the instant invention lies in the ability to carry out the reduction of sulfur dioxide with low volatility coal at much lower temperatures than heretofore had been possible or even thought to be possible. Thus, in accordance with the present invention, sulfur dioxide, which is normally considered a pollutant, can be used to economically produce a useful product, such as sulfur.

SUMMARY OF THE INVENTION

In accordance with illustrative embodiments demonstrating features and advantages of the present invention, there is provided a process for the reduction of sulfur dioxide which comprises contacting a sulfur dioxide-containing off-gas with granular coal in the presence of steam. In this manner, the sulfur dioxide is reduced at least substantially to sulphur with some hydrogen sulfide as a minor by-product and the coal is oxidized.

BRIEF DESCRIPTION OF THE DRAWINGS

The above brief description, as well as further objects, features, and advantages of the present invention will be more fully appreciated by reference to the following detailed description of presently preferred but nonetheless illustrative embodiments in accordance with the present invention, when taken in connection with the accompanying drawings wherein.

DESCRIPTION OF THE PREFERRED EMBODIMENTS

Figure 1:
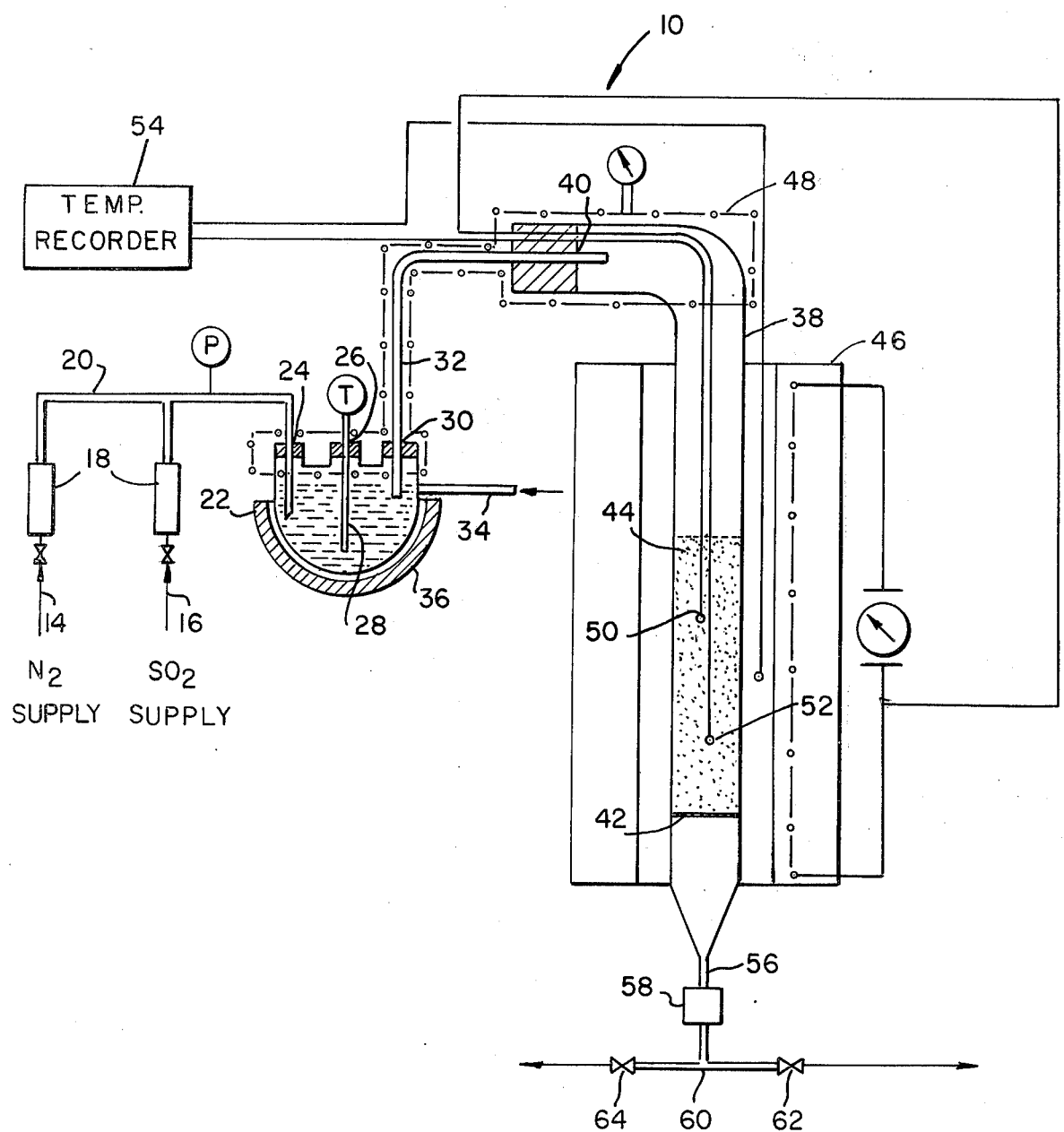
FIG. 1 is a flow scheme of a pilot plant for carrying out the process of reducing sulfur dioxide to sulfur of the present invention.

Referring now specifically to the drawings, there is shown in FIG. 1 a pilot plant generally designated by the reference numeral 10 for carrying out the procedures for the reduction of sulfur dioxide to sulfur. Accordingly, the pilot plant 10 includes a gas supply system 12 comprising a source of nitrogen 14, as a dilutant, and a source of sulfur dioxide 16 in flow communication with a pair of rotameters 18 for measuring the gas input. A supply line 20 is connected between the rotameters 18 and a humidifier vessel 22 which has an inlet opening 24 for receiving the supply line 20, a central opening 26 for receiving a thermometer 28, and an outlet opening 30 for receiving an exhaust line 32. The humidifier vessel 22 is provided with a supply of water by means of an inlet line 34 and the water is maintained at a given temperature by means of a heating mantle 36.

For carrying out the reduction process of the present invention, there is provided a reactor vessel 38, which is formed with an inlet opening 40 for receiving outlet line 32. A circular grid 42 is mounted along the lower portion of reactor vessel 38 for supporting a bed of granular coal 44. Exteriorly positioned with respect to the reactor vessel 38 is an annular electric heater 46, which is positioned to surround the granulated coal bed 44. The electric heater 46 is used to maintain a temperature of at least 1150° F. within the coal bed 44. A preheater, which is denoted by the dot-dash lines designated 48, extends from the upper portion of humidifier vessel 22 to the inlet of reactor vessel 38, for maintaining the correct humidity-temperature relationship.

The temperatures of the coal bed 44 and of the midpoint of the exterior or "skin" of the reactor vessel 38 are obtained by the thermocouples 50 and 68, which are connected to a temperature recorder 54. Thermocouple 68 is connected to an on-off controller (not shown) which places an external (not heating elemental) resistance (not shown) into or out of the heating circuit in order to control the temperature. When thermocouple 68 gives a high reading, the resistance is part of the circuit; when it gives a low reading, it is removed from the circuit. It should be noted that it is preferable for the thermocouples 50 and 68 to be respectively placed in a position approximately one-half and three-quarters of the longitudinal distance of the coal bed 44 in reactor vessel 38. The reactor vessel 38 is formed with an outlet opening 56, which is connected to a product receiver 58 that is, in turn, connected to an outlet line 60. The outline line 60 is provided with a valve 62 for passing the flow on through to a chromatographic injection needle for analyzing the gas composition, and a valve 64, for passing the flow on through to a calibrated displacement cylinder for measuring the volume of outcoming gas. Thus in accordance with the present invention, the process for the reduction of sulfur dioxide is carried out in the pilot plant 10 by passing the sulfur dioxide-containing off-gas through line 20 into the humidifier vessel 22. Thus, the sulfur dioxide-containing off-gas and steam which is formed in the humidifer vessel 22 is passed through line 32 into the reactor vessel 38 such that the sulfur dioxide-containing off-gas is contacted with the granular coal bed 44 in the presence of the steam. In this manner, the sulfur dioxide is reduced to sulfur and hydrogen sulfide while the coal bed 44 is oxidized.

Figure 2:
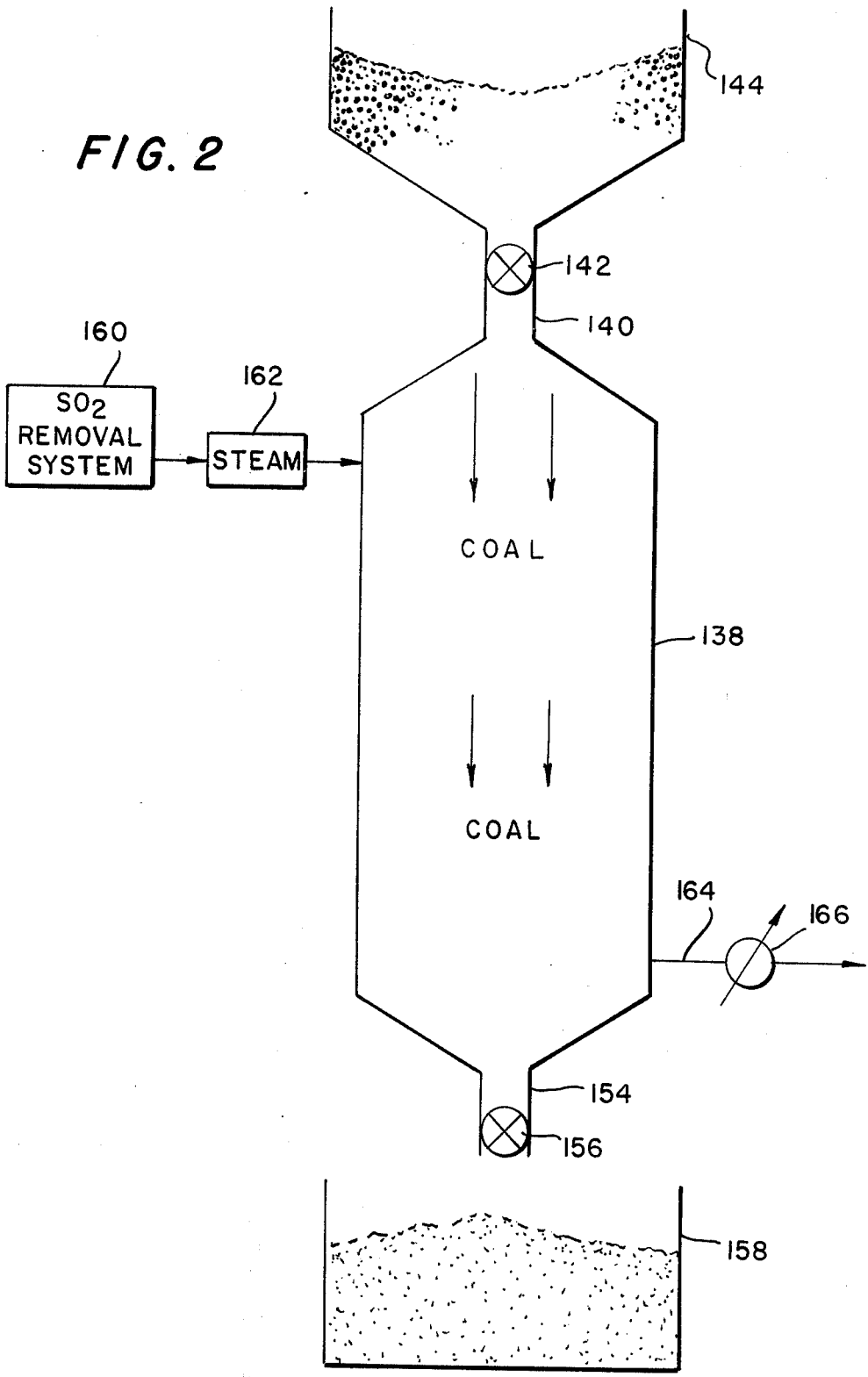
FIG. 2 is an elevational view of a commercial apparatus for carrying out the process of the present invention.

Turning to FIG. 2, there is illustrated a further embodiment of the invention in which most of the corresponding parts have been designated by the same reference numerals, as part of a "100" series. In this form of the invention, there is shown a reactor vessel 138 formed with an upper inlet 140 which is connected in flow communication with a valve 142 and a granular coal hopper 144. The reactor vessel 138 is formed with a lower outlet 154 and valve 156, which are positioned directly above an ash product trough 158. It should be understood that the coal in reactor vessel 138 does not require any supplementary source of heat for the maintenance of the minimum reactor coal temperature of at least 1150° F. as is the case for the pilot plant 10. This is due to the fact that the continuous process generates and maintains the required minimum temperature. Shown schematically in FIG. 2 is a sulfur dioxide removal system 160, which is capable of taking either the form of a dry scrubbing system, or a wet scrubbing system, many types of which are well known in the art. Also shown schematically is a source of steam 162 which is required in accordance with the present invention. A sulfur output line 164 with an accompanying cooler 166 is connected at the bottom of reactor vessel 138 for removing the sulfur. The continuous process for the reduction of a sulfur dioxide containing-off-gas in accordance with the present invention comprises passing the sulfur dioxide containing-off gas from the removal system 160 in the presence of steam from source 162 into the reactor vessel 138. A continuous supply of granular coal from hopper 144 is passed into the reactor vessel 138 for reduction of the sulfur dioxide, thereby oxidizing the coal and forming an ash product. The ash product is continuously removed from the reactor vessel 138 to the trough 158. The input flow of the coal from the supply hopper 144 and the effluent flow of the ash product are regulated by the control valves 142 and 156, respectively, such that a relatively high proportion of the coal is utilized for the reduction of the sulfur dioxide. It should be understood that the source of steam 162 is required only when the off-gas from the sulfur dioxide removal system 160 does not contain a sufficient amount of moisture to satisfy the requirements of the present invention.

While not wishing to be bound or limited by any theory, it is nevertheless believed that the essential basis of the present invention resides in the fact that a source of carbon such as coal effectively can reduce sulfur dioxide to sulfur and that this reduction can be so enhanced by steam as to make it possible for such reduction to take place at commercially attractive low temperatures, such as those ranging from at least 1150° F. to 1550° F. While it has been known heretofore to reduce sulfur dioxide at elevated temperatures (upwards of 1550° F. and commonly upwards of 2000° F.) with sources of hydrocarbons that are compatible with such temperatures, it has not been known heretofore that the combined application of steam and coal allows the reaction to proceed at substantially lower temperatures.

In the present invention, granular coal is the preferred source of carbon, and, in general, all of the usual types of coal used commercially may be employed in the practice of this invention including peat, lignite, anthracite, subbituminous, bituminous, super-bituminous coal, or coke. Preferably, the coal is in granular or particulate form in a pulverized or crushed state. However, it should be noted that particles that are too fine are not preferred since expensive grinding or milling equipment is required to produce them, and simple crushed coal is preferred. Most coals including bituminous coal or any of the variant forms thereof (such as those specified above) are characterized by having a volatile (ordinarily hydrocarbonaceous) component and a non-volatile component of fixed carbon content, and thus the preferred sources of the various types of bituminous coal used herein include those having a volatile content of approximately 20-60% and a non-volatile or fixed content comprising essentially the balance, except for minor amounts of conventional impurities (such as ash) that may be present. In general, as illustrated more particularly in Example IV, set forth below, the fixed or non-volatile carbon content of the coal to be used varies widely in accordance with the nature or type of coal employed, ranging, e.g., from an amount as high as 90% or more in coke, 80% or more in anthracite, etc., to an amount as low as 25%-35% or more in conventional bituminous coal. In any event, however, it is the reaction primarily between the fixed or non-volatile carbon content of the given coal and the sulfur dioxide, which, when conducted in the presence of steam, preferably with at least one mole of steam per mole of sulfur dioxide, engenders the reduction of sulfur dioxide at least substantially to elemental sulfur at unexpectedly low temperatures and gives rise to the special benefits offered by the present invention that appear to afford significant commercial promise and attractiveness.

The steam that is used can be derived from the water content of the original $SO_2$-containing off-gas if such content is sufficiently high, but, if not, a suitable source of superheated steam, such as that generated from a boiler or reboiler, can be utilized as a supplemental source. To successfully practice the present invention, it is preferred that about one mole of water per mole of sulfur dioxide should be present in the reaction zone.

In general, steam and $SO_2$ are utilized, respectively, in a ratio ranging from 1.0 mole, preferably upwards of 1.0 mole, of $H_2O$ per mole of $SO_2$, preferably about 3.0 moles of $H_2O$ per mole of $SO_2$, or more.

The present reduction of sulfur dioxide to elemental or free sulfur through reaction of said sulfur dioxide with granular coal, in the presence of steam, proceeds at temperatures ranging from at least 1150° F. to about 1550° F., and such reduction is conducted to an extent such that the elemental sulfur content of the product realized from such reduction comprises the major component obtained, while other components, such as hydrogen sulfide, COS, etc., result only as small, minor components. By the terminology "major amount or major component" or "at least substantially reduced to sulfur" it is intended to embrace an extent of reduction that approximates a yield of upwards of about 60% to about 98% free sulfur, the latter part of the range being more readily obtainable upon careful control of the reduction reaction.

Figure 3:
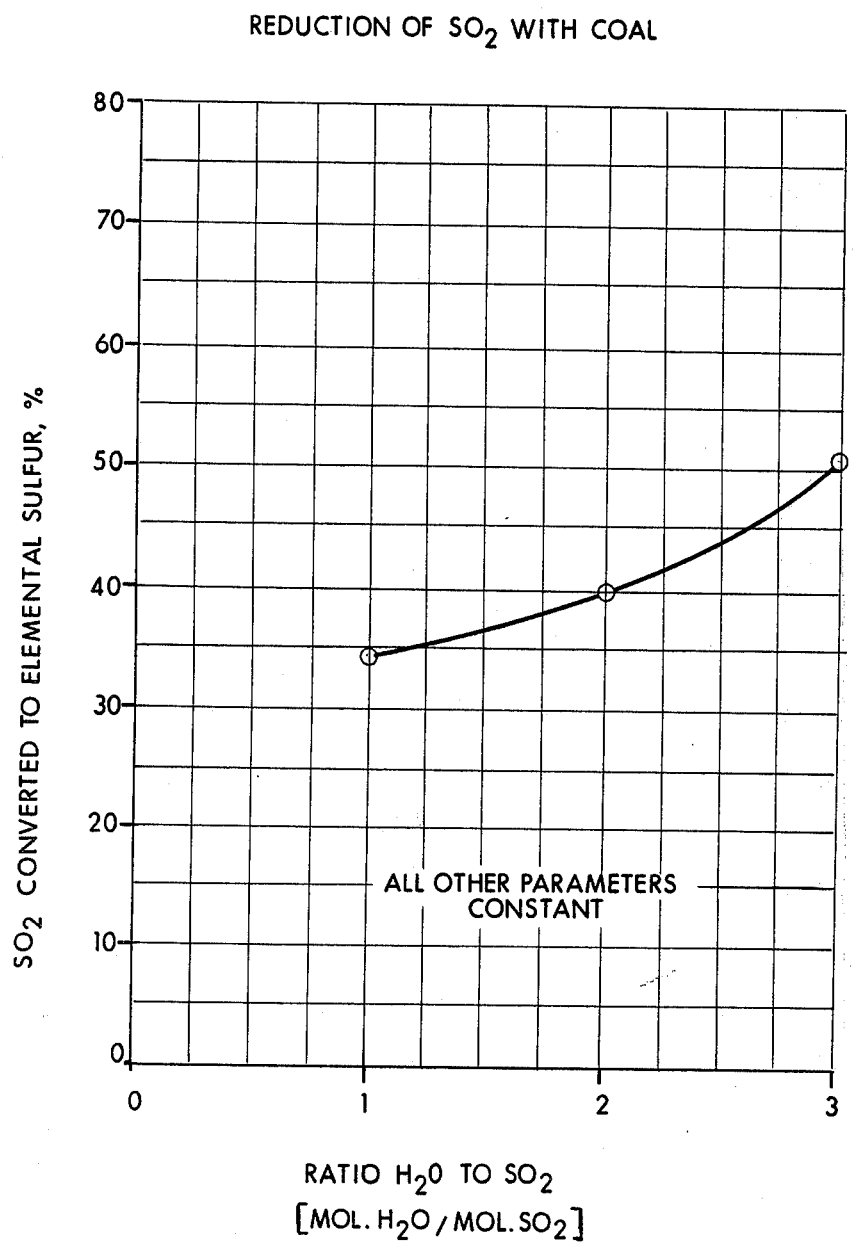
FIG. 3 is a graphic representation showing the results obtainable from the reduction of SO₂ with coal in the presence of steam with varying H₂O/SO₂ mole ratios.

The effect of the relative amounts of steam and sulfur dioxide that are used to accomplish the present reduction of $SO_2$ may be seen by reference to FIG. 3 of the drawings, and the relationship that exists between these two variables can be derived from the graphic representation shown therein.

It is known to those skilled in the art that reduction of $SO_2$ to sulfide proceeds in stages, whereby sulfur dioxide is first reduced to elemental or free sulfur and then further reduced from the elemental state to the sulfide form. Theoretically, while it may be possible, under ideal conditions and circumstances, for the reduction to be terminated once the desired conversion of sulfur dioxide to sulfur is reached prior to further reduction of the latter to sulfide, nevertheless, under conditions of ordinary commercial practice, this theoretical reduction cannot be so perfectly controlled or terminated to the absolute and entire exclusion of hydrogen sulfide and other by-products, with the result that some hydrogen sulfide is of necessity formed as a by-product. Implicit recognition, throughout this description of the present invention, has been accorded this fact whenever it has been said that the present process for the reduction of sulfur dioxide is conducted until such sulfur dioxide is "at least substantially reduced to sulfur".

Prior to the present invention, it was widely known that high temperatures of approximately 1850° F.–2400° F. constituted a normal environment for reaction of coal with steam, owing to the endothermic nature of this reaction; and this led those skilled in the art to make use of catalysts such as heavy metal oxides, e.g., iron oxide, in an attempt to reduce heating costs and the overall temperature level. It was also known that $SO_2$ can be reacted with coal at a commercially practical rate at temperatures over 2000° F. But, even than, under these conditions, it was customery to have to resort to supplemental heat and reducing agent sources such as hydrocarbon or petroleum oils. The injection of hydrocarbons and/or petroleum oils will also result in lower reaction temperatures. However, the present invention achieves the desired low reaction temperatures without the injection of the scarcely available hydrocarbons or petroleum oils.

It surprisingly has been found, as discussed above, that the combination of steam and sulfur dioxide, when utilized with a suitable carbon source such as granular coal, enables operation of the reduction of $SO_2$ at much lower operating temperatures than had heretofore been thought possible.

In Examples I, II, and III, there is provided a compilation of data obtained from operating the pilot plant 10. Example IV describes the sources of coal used in Examples I–III, and also illustrates a typical examples of coke that can be utilized in the practice of this invention.

By referring to Examples I and II, it can be appreciated that the sulfur dioxide-containing off-gas is contacted with granular coal at a temperature range of at least 1150° F. to 1550° F. in the presence of steam.

EXAMPLE I

| CONDITIONS FOR PRODUCTION OF SULFUR | | | | |
|---|---|---|---|---|
| RUN | 1 | 2 | 3 | 4 |
| FEED - Ft. 3/hr. at 60° F. | | | | |
| $SO_2$ | 0.218 | 0.218 | 0.215 | 0.215 |
| $N_2$ | 0.435 | 0.435 | 0.438 | 0.438 |
| $H_2O$ | 0.426 | 0.432 | 0.419 | 0.437 |
| TOTAL | 1.079 | 1.085 | 1.072 | 1.090 |
| FEED - Wet Mol.% | | | | |
| $SO_2$ | 20.2 | 20.1 | 20.0 | 19.7 |
| $N_2$ | 40.3 | 40.1 | 40.9 | 40.2 |
| $H_2O$ | 39.5 | 39.8 | 39.1 | 40.1 |
| TOTAL | 100.0 | 100.0 | 100.0 | 100.0 |
| TEMPERATURES ° F. | | | | |
| ⅓ Coal* Bed-Immersion | 1206 | 1254 | 1275 | 1268 |
| ⅔ Coal* Bed-Immersion | 1150 | 1175 | 1180 | 1180 |
| ⅓ Coal* Bed-Skin | 1182 | 1225 | 1245 | 1229 |
| Mol. Ratio $H_2O/SO_2$ | 1.95 | 1.98 | 1.95 | 2.03 |

-continued

| CONDITIONS FOR PRODUCTION OF SULFUR | | | | |
|---|---|---|---|---|
| Product Gas - Ft. 3/hr. at 60° F. | 0.618 | 0.664 | 0.638 | 0.613 |
| Contact Time - Sec. (inlet gas volume & open tube) (corrected for coal consumption) | 6.7 | 6.2 | 5.9 | 5.5 |
| % of Coal* Bed Consumed | 27.9 | 32.6 | 37.8 | 39.5 |
| Product Gas Analysis - Mol.% | | | | |
| $N_2$ | 70.1 | 67.4 | 68.7 | 78.8 |
| $CO_2$ | 15.7 | 25.7 | 27.7 | 20.1 |
| COS | 0.0 | 0.0 | 0.0 | 0.0 |
| $H_2S$ | 0.7 | 2.6 | 3.6 | 1.1 |
| $CS_2$ | 0.0 | 0.0 | 0.0 | 0.0 |
| $SO_2$ | 13.5 | 4.3 | 0.0 | 0.0 |
| CO | 0.0 | 0.0 | 0.0 | 0.0 |
| $H_2$ | 0.0 | 0.0 | 0.0 | 0.0 |
| Sulfur in Product - gms/hr. | | | | |
| $H_2S$ | 0.17 | 0.66 | 0.88 | 0.26 |
| COS | 0.0 | 0.0 | 0.0 | 0.0 |
| $CS_2$ | 0.0 | 0.0 | 0.0 | 0.0 |
| $SO_2$ | 3.19 | 1.09 | 0.0 | 0.0 |
| Solid Sulfur | 4.99 | 6.60 | 7.35 | 7.97 |
| TOTAL | 8.35 | 8.35 | 8.23 | 8.23 |
| Sulfur From Feed - gms/hr. | 8.35 | 8.35 | 8.23 | 8.23 |
| Nitrogen Balance | 0.996 | 1.030 | ND | 1.103 |
| Carbon Consumption-gms/hr. | | | | |
| Gas Analysis | 1.39 | 2.45 | 2.54 | 1.77 |
| Theoretical from $SO_2+C \to CO_2+S$ = 0.375 × (gms/hr. sulfur) | 1.87 | 2.48 | 2.76 | 2.99 |
| $SO_2$ Conversion - % | 61.8 | 86.9 | 100 | 100 |
| Selectivity - $\frac{\text{Mol S Produced}}{\text{Mol } SO_2 \text{ Consumed}}$ | 0.967 | 0.909 | 0.893 | 0.968 |

| RUN | 5 | 6 |
|---|---|---|
| FEED - Ft. 3/hr. at 60° F. | | |
| $SO_2$ | 0.215 | 0.231 |
| $N_2$ | 0.438 | 0.422 |
| $H_2O$ | 0.448 | 0.425 |
| TOTAL | 1.101 | 1.078 |
| FEED - Wet Mol.% | | |
| $SO_2$ | 19.5 | 21.5 |
| $N_2$ | 39.8 | 39.1 |
| $H_2O$ | 40.7 | 39.4 |
| TOTAL | 100.0 | 100.0 |
| TEMPERATURES ° F. | | |
| ⅓ Coal* Bed-Immersion | 1270 | 1411 |
| ⅔ Coal* Bed-Immersion | 1220 | 1340 |
| ⅓ Coal* Bed-Skin | 1258 | 1396 |
| Mol. Ratio $H_2O/SO_2$ | 2.08 | 1.84 |
| Product Gas - Ft. 3/hr. at 60° F. | 0.650 | 0.592 |
| Contact Time - Sec. (inlet gas volume & open tube) (corrected for coal consumption) | 5.1 | 4.3 |
| % of Coal* Bed Consumed | 44.9 | 53.8 |
| Product Gas Analysis - Mol.% | | |
| $N_2$ | 69.2 | 71.3 |
| $CO_2$ | 23.7 | 21.3 |
| COS | 0.4 | 0.1 |
| $H_2S$ | 1.0 | 0.7 |
| $CS_2$ | 0.0 | 0.0 |
| $SO_2$ | 5.7 | 6.6 |
| CO | 0.0 | 0.0 |
| $H_2$ | 0.0 | 0.0 |
| Sulfur in Product - gms/hr. | | |
| $H_2S$ | 0.25 | 0.16 |
| COS | 0.10 | 0.02 |

-continued
CONDITIONS FOR PRODUCTION OF SULFUR

| | | |
|---|---|---|
| $CS_2$ | 0.0 | 0.0 |
| $SO_2$ | 1.42 | 1.50 |
| Solid Sulfur | 6.46 | 7.17 |
| TOTAL | 8.23 | 8.85 |
| Sulfur From Feed - gms/hr. | 8.23 | 8.85 |
| Nitrogen Balance | 1.027 | — |
| Carbon Consumption-gms/hr. | | |
|   Gas Analysis | 2.25 | 1.81 |
|   Theoretical from $SO_2 + C \rightarrow CO_2 + S$ $= 0.375 \times$ (gms/hr. sulfur) | 2.42 | 2.69 |
| $SO_2$ Conversion - % | 82.7 | 83.0 |
| Selectivity - $\frac{\text{Mol S Produced}}{\text{Mol SO}_2 \text{ Consumed}}$ | 0.949 | .976 |

\* = bituminous coal

EXAMPLE II

CONDITIONS FOR PRODUCTION OF SULFUR*

| RUN | 1 | 2 | 3 | 4 |
|---|---|---|---|---|
| FEED - SCFH at 60° F. | | | | |
| $SO_2$ | 75.6 | 37.3 | 75.7 | 37.3 |
| $N_2$ | 37.8 | 20.0 | 36.5 | 18.8 |
| $CO_2$ | 37.5 | 18.8 | 36.8 | 18.8 |
| Air (for bringing reactor to temp) | | 52.1 | | 19.5 |
| $H_2O$ | 225.5 | 115.5 | 225.5 | 112.1 |
| TOTAL | 376.4 | 243.7 | 374.5 | 206.5 |
| FEED - Wet Mol.% | | | | |
| $SO_2$ | 20.1 | 15.3 | 20.2 | 18.1 |
| $N_2$ | 10.0 | 8.2 | 9.8 | 9.1 |
| $CO_2$ | 10.0 | 7.7 | 9.8 | 9.1 |
| Air | | 21.4 | | 9.5 |
| $H_2O$ | 59.9 | 47.4 | 60.2 | 54.2 |
| TOTAL | 100.0 | 100.0 | 100.0 | 100.0 |
| Average Reaction Temperature - ° F. | 1394 | 1440 | 1483 | 1523 |
| Maximum Recorded Temperature - ° F. | 1430 | 1480 | 1550 | 1540 |
| Product Gas - SCFH at 60° F. | 137.0 | 124.6 | 153.4 | 82.1 |
| Contact Time - Sec. (Based on inlet gas volume and open tube) | 9.4 | 6.0 | 9.1 | 5.4 |
| Product Gas Analysis - Mol. % | | | | |
| $N_2$ | 27.6 | 48.7 | 23.8 | 41.4 |
| $CO_2$ | 59.1 | 48.2 | 62.8 | 52.4 |
| COS | 1.4 | 2.0 | 2.1 | 5.1 |
| $H_2S$ | 0.8 | 0.6 | 7.6 | 0.5 |
| $CS_2$ | 0.1 | 0.0 | 0.08 | 0.0 |
| $SO_2$ | 11.0 | 0.5 | 3.6 | 0.6 |
| Sulfur in Product - lb/hr. | | | | |
| From $H_2S$ | 0.09 | 0.06 | 0.98 | 0.03 |
| From COS | 0.16 | 0.21 | 0.27 | 0.35 |
| From $CS_2$ | 0.02 | 0.0 | 0.02 | 0.0 |
| From $SO_2$ | 1.27 | 0.05 | 0.47 | 0.04 |
| Solid Sulfur | 4.84 | 2.83 | 4.64 | 2.73 |
| TOTAL | 6.38 | 3.15 | 6.38 | 3.15 |
| Sulfur from Feed - lb/hr. | 6.38 | 3.15 | 6.38 | 3.15 |
| Lb. Carbon Consumed/lb. $SO_2$ converted | 0.14 | 0.17 | 0.17 | 0.12 |
| $SO_2$ Conversion -% | 80.1 | 98.4 | 92.7 | 98.7 |
| Selectivity - $\frac{\text{Mol S Produced}}{\text{Mol SO}_2 \text{ Consumed}}$ | .948 | .912 | .784 | .876 |
| Sulfur yield - weight % of sulfur in feed | 75.9 | 89.7 | 72.7 | 86.5 |

\* using anthracite coal

EXAMPLE III

CONDITIONS FOR PRODUCTION OF SULFUR

In this Example, a sulfur dioxide-containing off-gas was contacted with a granular anthracite coal at a temperature within the range of from at least 1150° F. to 1550° F. in the presence of steam, and the relationship explored between sulfur dioxide conversion and the steam/$SO_2$ ratio (mole). The results are as follows:

| | | | |
|---|---|---|---|
| Feed, $H_2O/SO_2$ Ratio | 3.0 | 2.0 | 1.0 |
| Bed Temperature, ° F. | | | |
|   Top | 1321 | 1326 | 1321 |
|   Center | 1206 | 1198 | 1206 |
|   Bottom | 1318 | 1320 | 1318 |
| Feed Gas, Vol. %[(1)] | | | |
|   $SO_2$ | 20 | 20 | 20 |
|   $N_2$ | 20 | 40 | 60 |
|   $H_2O$ | 60 | 40 | 20 |
| Conversion of $SO_2$ to Elemental Sulfur, Percent | 51.0 | 40.0 | 34.2 |

[(1)] Gas residence = 8.2 seconds

EXAMPLE IV (1) The bituminous coal used in Example I was mined in the Western United States in the New Mexico region and has the following approximate percentage weight analysis:

| | |
|---|---|
| Moisture | 7.04 |
| Volatile Matter | 35.10 |
| Fixed Carbon | 37.10 |
| Ash | 20.76 |

-continued

| | |
|---|---|
| | 100.00 |

(2) The anthracite used in Examples II and III was mined in the Wyoming Valley Region of Pennsylvania and has the following approximate percentage weight analysis:

| | |
|---|---|
| Moisture | 3.55 |
| Volatile Matter | 4.52 |
| Fixed Carbon | 81.85 |
| Ash | 10.08 |
| | 100.00 |

(3) A typical coke capable of being used in accordance with the present invention has the following approximate percentage weight analysis:

| | |
|---|---|
| Moisture | 0.69 |
| Volatile Matter | 6.16 |
| Fixed Carbon | 92.60 |
| Ash | 0.55 |
| | 100.00 |

As previously noted, in processes for sulfur dioxide conversion, prior to this invention, temperatures well above the 1550° F. temperature range were common and, in fact, normally approximated temperatures of about 2000° F. and upwards. In accordance with the present invention, however, as is confirmed by the Examples above, it is possible to obtain high conversion of sulfur dioxide to elemental sulfur at temperatures ranging between 1150° F. to 1550° F., since the present reduction process operates in the presence of steam, utilizing coal as a reducing agent.

By referring to Runs 3 and 4, respectively, of Example II, moreover, it can be seen that 92.7% and 98.7% of the input sulfur dioxide feed was converted to provide 72.7% and 86.5% yield of elemental or free sulfur. Furthermore, for this conversion, 0.17 and 0.12 pounds of carbon, respectively, were consumed per pound of sulfur dioxide converted. These results, under the conditions described, thus illustrate the commercial attractiveness of the present invention.

A latitude of modification, change, and substitution is intended in the foregoing disclosure, and, in some instances, some features of the invention will be employed without corresponding use of other features. Accordingly, it is appropriate that the appended claims be construed broadly and in a manner consistent with the spirit and scope of the invention herein.

What is claimed is:

1. A continuous process for the reduction of sulfur dioxide to sulfur comprising introducing steam and a sulfur dioxide-containing off-gas in a mole ratio of steam to $SO_2$ of from 2 to 3 into a reactor containing coal and maintained at a temperature which will convert the sulfur dioxide to sulfur, said temperature being from 1150° F. to 1550° F., contacting said sulfur dioxide-containing off-gas and said steam with said coal in said reactor and withdrawing sulfur from said reactor.

2. A process for the reduction of sulfur dioxide to sulfur according to claim 1 in which said coal is granular.

3. The process of claim 2 wherein the contact time of the sulfur dioxide-steam mixture with the coal is from 5.1 to 9.1 seconds.

4. A continuous process for the reduction of a sulfur dioxide containing off-gas to sulfur according to claim 1, in which the input flow of said coal and the effluent flow of ash product are regulated such that a relatively high proportion of said coal is utilized for said reduction of sulfur dioxide.

5. The process of claim 4 wherein the contact time of the sulfur dioxide-steam mixture with the coal is from 5.1 to 9.1 seconds.

6. The process of claim 1 wherein at least 60 percent of the sulfur dioxide is converted to sulfur.

7. The process of claim 6 wherein the contact time of the sulfur dioxide-steam mixture with the coal is from 5.1 to 9.1 seconds.

8. The process of claim 1 wherein the contact time of the sulfur dioxide-steam mixture with the coal is from 5.1 to 9.1 seconds.

* * * * *